United States Patent [19]
Parker

[11] 3,770,490
[45] Nov. 6, 1973

[54] METHOD OF MAKING AND COATING WITH HIGH SOLIDS CURED ACRYLIC SYRUPS

[75] Inventor: Earl E. Parker, Allison Park, Pa.

[73] Assignee: PPG Industries, Inc., Pittsburgh, Pa.

[22] Filed: Jan. 5, 1971

[21] Appl. No.: 104,134

[52] U.S. Cl............ 117/93.31, 117/95, 117/132 C, 117/161 NB, 117/161 UC, 204/159.16, 260/89.5 A, 260/885, 264/22, 264/25
[51] Int. Cl............................................. B44d 1/50
[58] Field of Search.................. 117/93.31, 161 UC, 117/161 UB, 95, 132 C; 204/159.16, 159.23; 260/885, 89.5 A, 89.5 S

[56] References Cited
UNITED STATES PATENTS

| | | | |
|---|---|---|---|
| 3,359,129 | 12/1967 | Mao | 117/93.31 |
| 2,367,660 | 1/1945 | Agre | 204/159.23 |
| 2,750,320 | 6/1956 | Latham | 204/159.23 |
| 2,900,277 | 8/1959 | Schmitz | 117/161 UB |
| 2,940,950 | 6/1960 | Gusman | 117/161 UB |
| 2,949,383 | 8/1960 | Blake | 117/161 UB |
| 2,986,507 | 5/1961 | Steck | 204/159.16 |

*Primary Examiner*—Alfred L. Leavitt
*Assistant Examiner*—J. H. Newsome
*Attorney*—Chisholm & Spencer

[57] ABSTRACT

A method of curing acrylic syrups comprises polymerizing a mixture of acrylic monomers, isopropyl alcohol, and peroxide catalyst by subjecting to heat and adding monofunctional acrylic monomers and poly-functional acrylic monomers to the polymerized acrylic composition to form an acrylic syrup and curing the acrylic syrup by subjecting to either ionizing irradiation or actinic light. The cured syrups are useful as interior container coatings.

25 Claims, No Drawings

METHOD OF MAKING AND COATING WITH HIGH SOLIDS CURED ACRYLIC SYRUPS

This invention relates to a novel method of forming cured acrylic syrups which may be used as interior coating materials for food and beverage containers.

In copending application Ser. No. 18,333 filed March 2, 1970 now abandoned, it is disclosed that superior, interior liners for food and beverage containers are formed by coating the container with an acrylic syrup comprising one or more thermoplastic acrylic polymers having a number average molecular weight below about 250,000 and one or more acrylic monomers and subjecting the coating to ionizing irradiation or actinic light.

It has now been discovered that the acrylic syrups may be prepared by polymerizing mono-functional acrylic monomers in the presence of isopropyl alcohol and then adding monomers to the polymers, and the syrups when cured by ionizing irradiation or actinic light will have less volatile material loss and require a lower dose of radiation to cure and the cured product will have increased flexibility.

The acrylic syrups of this invention are prepared by polymerizing acrylic monomers in the presence of isopropyl alcohol and then adding acrylic monomers to be formed polymers.

The acrylic monomers to be polymerized comprise one or more mono-functional acrylic monomers having the formula:

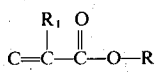

wherein R is selected from the group consisting of H, alkyl, aryl, cycloalkyl, substituted alkyl, substituted aryl and substituted cycloalkyl, and $R_1$ is selected from the group consisting of H and $CH_3$.

The alkyl groups may be methyl, ethyl, propyl, isopropyl, butyl, hexyl, octadecyl, and the like. It is preferred that the alkyl group contains from one to 10 carbon atoms. Any aryl groups may be used such as benzyl, phenyl, and the like. Preferably, however, the aryl group contains from six to 18 carbon atoms. Cycloalkyl groups which R may represent are cyclohexyl, cyclopentyl, cyclooctyl, and the like. The preferred cycloalkyl group contains up to about eight carbon atoms. The alkyl, aryl and cycloalkyl groups may be substituted with halogens, hydroxyl groups, and the like.

Typical of the acrylic monomers which may be employed are methyl acrylate, isopropyl acrylate, cyclopentyl acrylate, 2-ethylhexyl acrylate, decyl acrylate, decyl thioacrylate, dodecyl acrylate, octadecyl acrylate, acrylic acid, methacrylic acid, hydroxy ethyl acrylate and hydroxy butyl acrylate, and the like. The preferred acrylic monomers are lower alkyl acrylates such as butyl acrylates.

The acrylic monomers above are polymerized in the presence of isopropyl alcohol and a peroxide catalyst.

The amount of isopropyl alcohol used is from about 5 to about 90 percent by weight of the mixture of isopropyl alcohol and mono-functional acrylic monomers. Generally, if a mixture of alcohol and acrylic monomers contains less than about 5 percent isopropyl alcohol it is difficult to strip the solvent and thin the polymer with acrylic monomers.

The peroxide catalysts used for the polymerization are organic peroxides and organic hydroperoxides or esters thereof. Typical organic peroxides useful as catalysts herein include:
  benzoyl peroxide
  acetyl peroxide
  lauroyl peroxide
  methyl ethyl ketone peroxide
  cyclohexanone peroxide
and the like.

Organic hydroperoxides are their esters with carboxylic acids useful as catalysts include:
  cumene hydroperoxide
  tertiary butyl hydroperoxide
  ditertiary butyl perphthalate
  1-hydroxycyclohexyl hydroperoxide
and the like.

Many other useful catalysts are disclosed in the monograph "Organic Peroxides" by A. V. Tovolsky and R. B. Mesrobian, copyrighted in 1954 by Interscience Publishers, Inc., New York, pages 158–163 such as azobis isobutyronitrile. These catalysts may be utilized in amounts of about 0.1 to about 5 percent by weight based upon the mixture of interpolymerizable materials.

The composition to be polymerized may also contain solvents for the polymer produced to achieve a desired viscosity. Thus conventional solvents such as methyl ethyl ketone, and the like may be added to the monomer composition to be polymerized.

The polymerization reaction is carried out by heating the reactants until the viscosity of the material is stable. Generally, the polymerization is carried out at temperatures from about 80° to about 150°C. for about 2 to about 16 hours.

The preferred method of polymerizing the materials herein is to first reflux a small amount (for example, 10 percent) of the mixture of mono-functional acrylic monomers and isopropyl alcohol and to add the remaining mono-functional acrylic monomers, isopropyl alcohol, and the peroxide catalyst to the refluxing mixture slowly until the polymerization has taken place. In this way, the mixture will not gel prematurely.

After the polymerization reaction, the remaining isopropyl alcohol is distilled out and the acrylic polymer product is thinned with the addition of mono-functional acrylic monomers. The acrylic monomers can generally be any mono-functional acrylic monomers such as those used to prepare the polymers.

The syrup produced should contain from about 30 to about 50 percent by weight of the added mono-functional acrylic monomers. Additional crosslinking poly-functional acrylic monomers should be added prior to the curing step to aid in the curing of the syrup. Any poly-functional acrylic monomer may be used for these purposes such as diacrylates such as ethylene glycol diacrylate, triethylene glycol diacrylate, polypropylene glycol diacrylate, butylene glycol diacrylate and 1,4-butane diol diacrylate and triacrylates such as trimethylol ethane, trimethylol propane triacrylate and the like and tetra-acrylates such as pentaerythritol tetra-acrylate and the like.

The preferred crosslinking monomers are pentaerythritol tetra-acrylate, trimethylol propane triacrylate and ethylene glycol diacrylate. Generally from about 5 to about 70 percent by weight of the poly-functional acrylic monomers may be added to the syrup.

The acrylic syrup prepared is then cured to a film or coated on to a substrate and cured in situ by subjecting it to ionizing irradiation or to actinic light.

If the syrup is to be cured by actinic light, it is desirable to add photosensitizers such as benzoin, benzoin methyl ether, diphenyl disulfide, benzil, dibenzyl disulfide, and the like, to the syrups prior to subjecting to actinic light. The photosensitizers may comprise up to about 2 percent by weight of the syrup.

The term "irradiation," as used herein, means high energy radiation and/or the secondary energies resulting from conversion of electrons or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotrons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Massachusetts, or other types of accelerators as described in U.S. Pat. No. 2,763,609 and in British Pat. No. 762,953 are satisfactory for the practice of this invention.

The compositions described herein will polymerize acceptably using any total dosage between about 0.2 megarad and about 100 megarads. A "rad" is defined as that amount of radiation required to supply 100 ergs per gram of material being treated, and a "megarad" is $10^6$ rads. The total dosage is the total amount of irradiation received by the coating compositions. It has been found that the coatings will cure to form an excellent liner for food and beverage containers at a total dosage of less than 2 megarads. Preferable total dosage is about 5 or 6 megarads.

The compositions herein will also cure by exposure to actinic light. In general, the use of wave lengths in which sensitivity to actinic light occurs is approximately 1,800 to 4,000 angstrom units. Various suitable sources of the actinic light are available in the art including by way of example, quartz mercury lamps, ultraviolet cored carbon arcs, and high-flash lamps. Treatment is continued until the coating or film is cured.

The preferred use of the materials formed by the novel method of this invention is as interior container coatings.

The containers to which the above compositions are applied are usually made of a metal such as aluminum although tin-plate (cold rolled steel to which a thin layer of tin has been applied) and tin-free steel can also be employed, as can other materials, which need not always be metal. The containers can be of various sizes and shapes.

It is noted that the coatings can also be utilized as exterior coatings for the containers and, as such, it may be desired to coat both sides of the metal prior to forming the container body.

The following examples set forth specific embodiments of the instant invention, however, the invention is not to be construed as being limited to these embodiments for there are, of course, numerous possible variations and modifications. All parts and percentages in the Examples as well as throughout the specification are by weight unless otherwise indicated.

EXAMPLE 1

An acrylic syrup was prepared by the following method:

A flask was charged with 112 grams of a composition comprising 90 parts of isobutyl acrylate, 10 parts acrylic acid, 40 parts of isopropyl alcohol and 2 parts of benzoyl peroxide and the contents heated to reflux at about 90°C. When the composition showed a viscosity increase (indicating the start of polymerization) an additional 1030.4 grams of the above composition were added by means of a dropping funnel. When the viscosity of the composition became stable, the isopropyl alcohol was removed and the residue was diluted with enough isobutyl acrylate monomer to obtain a Gardner-Holdt, viscosity of $y$. The syrup contained 63 percent polymer and 37 percent mono-functional acrylic monomer.

To 75 parts of the syrup were added 5 parts of acrylic acid and 20 parts of trimethylol propane triacrylate monomer and the composition was coated onto tin free steel and subjected to electron beam irradiation to a total dosage of one megarad. The material was tested for adhesion by the cross hatch adhesion test wherein an X is marked on the coating and an adhesive tape pressed to the coating and then removed. It was found that none of the coating was removed by the tape, thus indicating excellent adhesion.

EXAMPLE 2

An acrylic syrup was prepared by the following method:

A flask was charged with 112 grams of a composition comprising 90 parts of butyl acrylate, 10 parts of methyl-methacrylate, 40 parts of isopropyl alcohol and 2 parts of benzoyl peroxide and the contents heated to reflux at about 90°C. When the composition showed a viscosity increase an additional 1030.4 grams of the above composition were added by means of a dropping funnel. When the viscosity of the composition became stable the isopropyl alcohol was removed and the residue was diluted with enough butyl acrylate monomer to obtain a Gardner-Holdt viscosity of $y$. The syrup contained 53 percent polymer and 47 percent mono-functional acrylic monomer.

To 75 parts of the syrup were added 5 parts of butyl acrylate and 20 parts of trimethylol propane triacrylate monomer and the composition was coated onto tin free steel and subjected to electron beam irradiation to a total dosage of one megarad. The material was tested for adhesion by the cross hatch adhesion test and found to have excellent adhesion.

EXAMPLE 3

An acrylic syrup was prepared by the following method:

A flask was charged with 112 grams of a composition comprising 80 parts of isobutyl acrylate, 20 parts of acrylic acid, 40 parts of isopropyl alcohol and 2 parts of benzoyl peroxide and the contents heated to reflux at about 90°C. When the composition showed a viscosity increase an additional 1030.4 grams of the above composition were added by means of a dropping funnel. When the viscosity of the composition became stable the isopropyl alcohol was removed and the residue was diluted with enough isobutyl acrylate monomer to obtain a Gardner-Holdt viscosity of $y$. The syrup contained 50 percent polymer and 50 percent mono-functional acrylic monomer.

To 75 parts of the syrup were added 5 parts of acrylic acid and 20 parts of trimethylol propane triacrylate monomer and the composition was coated onto tin free steel and subjected to electron beam irradiation to a total dosage of one megarad. The material was tested for adhesion by the cross hatch adhesion test and found to have excellent adhesion.

EXAMPLE 4

An acrylic syrup was prepared by the following method:

A flask was charged with 112 grams of a composition comprising 10 parts of acrylic acid, 30 parts of methyl methacrylate, 60 parts of butyl acrylate, 40 parts of isopropyl alcohol and 2 parts of benzoyl peroxide and the contents heated to reflux at about 90°C. When the composition showed a viscosity increase, an additional 1030.4 grams of the above composition were added by means of a dropping funnel. When the viscosity of the composition became stable the isopropyl alcohol was removed and the residue was diluted with enough butyl acrylate monomer to obtain a Gardner-Holdt viscosity of $z$. The syrup contained 45 percent polymer and 55 percent mono-functional acrylic monomer.

To 75 parts of syrup were added 5 parts of acrylic acid and 20 parts of trimethylol propane triacrylate monomer and the composition was coated onto tin free steel and subjected to electron beam irradiation to a total dosage of one megarad. The material was tested for adhesion by the cross hatch adhesion test and found to have excellent adhesion.

EXAMPLE 5

The suitability of the compositions of Examples 1 and 2 for can coatings were determined by comparing the flexability of these materials on tin free steel to the flexability of the same coating which was formed in the conventional manner.

The conventional coatings were formed by adding the same polymer to the same mono-functional and same poly-functional monomers and were coated onto tin free steel. No isopropyl alcohol was added in the formation of the polymer.

The flexability of the coated substrates was determined by the "wedge bend test" which is a conventional test for determining the flexability of canned coatings.

The "wedge bend test" comprises inserting 4½ × 2 inch coated panels which are bent, with the coated side on the outside, into a wedge formed by an upper steel rigging and a lower steel rigging. A 30 inch high block weighing 1,800 grams is dropped straight down on top of the wedge and the panel is then removed from the wedge and soaked in copper sulfate. The panel is then observed for coating fracture and the results are given in the length of fracture from the nip of the bend. The higher the number (millimeters), the less flexible is the material.

The results of the "wedge bend test" on the three samples were as follows:

| Coating | Cure in Megarads | Wedge Bend Millimeter's failure |
|---|---|---|
| Example 1 | 1 | 22 |
| Example 2 | 1 | 32 |
| Control | 1 | 56 |

As seen from the above tests, the coatings formed using the method of this invention were more flexible than the conventional coating.

According to the provisions of the patent statutes, there are described above the invention and what are now considered to be its best embodiments. However, within the scope of the appended claims, it is to be understood that the invention can be practiced otherwise than as specifically described.

I claim:

1. The method of forming a cured acrylic film comprising
   A. polymerizing a mixture of mono-functional acrylic monomers in the presence of isopropyl alcohol and a peroxide catalyst by subjecting the mixture to heat, B. adding mono-functional acrylic monomers to the polymerized acrylic materials, C. forming the mixture into a film, and D. curing the mixture by subjecting to ionizing irradiation or actinic light.

2. The method of claim 1 wherein the mono-functional acrylic monomer is acrylic acid, methacrylic acid or an ester of acrylic acid or methacrylic acid.

3. The method of claim 1 wherein the mixture is polymerized by subjecting to a temperature of from about 80° to about 100°C.

4. The method of claim 1 wherein the mixture is cured by subjecting to a total dosage of from about 0.2 megarads to about 20 megarads of ionizing irradiation.

5. The method of claim 2 wherein the amount of isopropyl alcohol used in Step (A) is from about 5 to about 90 percent based on the total weight of isopropyl alcohol and mono-functional monomers to be polymerized.

6. The method of claim 1 wherein the amount of mono-functional acrylic monomers added in Step (B) is from about 30 to about 50 percent by weight of the addition of the acrylic monomers in Step (A).

7. The method of claim 1 wherein crosslinking poly-functional acrylic monomers are additionally present in Step (B).

8. The method of claim 7 wherein the crosslinking poly-functional acrylic monomers comprise from about 5 to about 70 percent by weight of the added monomers in Step (B).

9. The method of claim 1 wherein the mixture to be polymerized in Step (A) is formed by slowly adding isopropyl alcohol and the mono-functional acrylic monomers and the catalyst to a small amount of isopropyl alcohol and mono-functional acrylic monomers while heating wherein the total amount of alcohol and monomers added slowly is greater than the amount of alcohol and monomers to which they are being added.

10. The method of claim 9 wherein the alcohol and monomers being added slowly comprise 90 percent by weight of the total alcohol and monomers being polymerized in Step (A).

11. A method of coating a substrate comprising

A. polymerizing a mixture of mono-functional acrylic monomers in the presence of isopropyl alcohol and a peroxide catalyst B. adding mono-functional acrylic monomers to the polymerized acrylic materials, and C. applying the mixture to the substrate and curing the mixture in situ by subjecting to ionizing irradiation of actinic light.

12. The method of claim 11 wherein the substrate is metal.

13. The method of claim 11 wherein the mono-functional acrylic monomer is acrylic acid, methacrylic acid or an ester of acrylic or methacrylic acid.

14. The method of claim 11 wherein the mixture is polymerized by subjecting to a temperature of from about 80°C. to about 100°C.

15. The method of claim 11 wherein the mixture is cured by subjecting to a total dosage of from about 0.2 megarads to about 20 megarads of ionizing irradiation.

16. The method of claim 11 wherein the isopropyl alcohol comprises from about 5 to about 90 percent by weight of the mixture in Step (A).

17. The method of claim 11 wherein the amount of mono-functional acrylic monomers added in Step (B) is from about 30 to about 50 percent by weight of the addition of the mono-functional acrylic monomers in Step (A).

18. The method of claim 11 wherein the mixture to be polymerized in Step (A) is formed by slowly adding isopropyl alcohol and the acrylic monomers and the catalyst to a mixture of isopropyl alcohol and acrylic monomers while heating wherein the total amount of alcohol and monomers added slowly is greater than the amount of alcohol and monomers to which they are being added.

19. The method of claim 11 wherein crosslinking poly-functional acrylic monomers are added to the mixture in Step (B).

20. The method of claim 19 wherein the crosslinking poly-functional acrylic monomers comprise from about 5 to about 70 percent by weight of the added acrylic monomers.

21. The method of coating the interior of a can comprising

A. polymerizing a mixture of mono-functional acrylic monomers in the presence of isopropyl alcohol and a peroxide catalyst and polymerizing by subjecting to heat, B. adding mono-functional monomers to the polymerized acrylic materials, and C. applying the mixture to the interior of the can and curing the mixture by subjecting to ionizing irradiation or actinic light.

22. The method of claim 21 wherein crosslinking poly-functional acrylic monomers are added in Step (B).

23. The method of claim 1 wherein subsequent to step (A) and prior to step (B), the isopropyl alcohol is removed.

24. The method of claim 1 wherein subsequent to step (A) and prior to step (B), the isopropyl alcohol is removed.

25. The method of claim 21 wherein subsequent to step (A) and prior to step (B) the isopropyl alcohol is removed.

* * * * *

UNITED STATES PATENT OFFICE
CERTIFICATE OF CORRECTION

Patent No. 3,770,490          Dated November 6, 1973

Inventor(s) Earl E. Parker

It is certified that error appears in the above-identified patent and that said Letters Patent are hereby corrected as shown below:

Claim 5, line 1, "2" should be -- 1 --.

Claim 11, line 9, "of" should be -- or --.

Claim 24, line 1, "1" should be -- 11 --.

Signed and sealed this 9th day of April 1974.

(SEAL)
Attest:

EDWARD M. FLETCHER, JR.
Attesting Officer

C. MARSHALL DANN
Commissioner of Patents